May 1, 1951 — E. H. L. ENGLUND ET AL — 2,551,428
ADJUSTABLE SCREW EYE SUPPORTING PLATE
Filed June 21, 1948
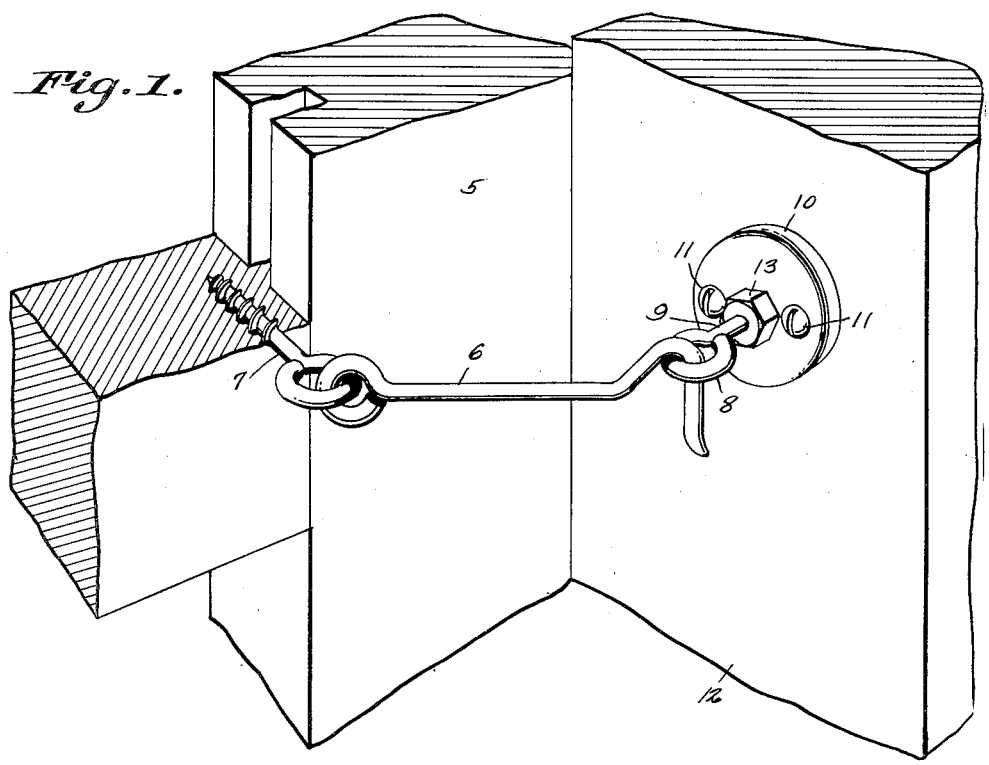
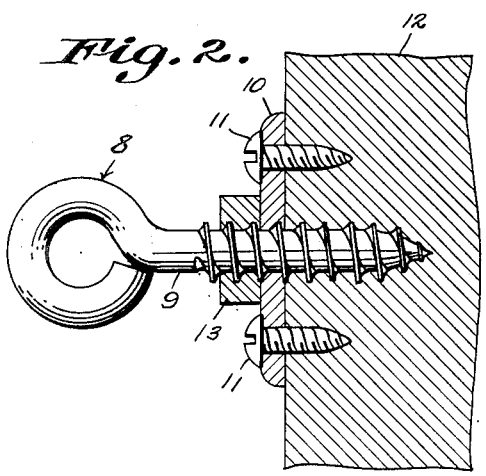
E. H. L. Englund
H. C. Strohm
INVENTOR
BY C. A. Snow & Co.
ATTORNEYS.

Patented May 1, 1951

2,551,428

UNITED STATES PATENT OFFICE 2,551,428

ADJUSTABLE SCREW EYE SUPPORTING PLATE

Edwin H. L. Englund and Herbert C. Strohm, Muskegon Heights, Mich.

Application June 21, 1948, Serial No. 34,226

1 Claim. (Cl. 292—341.18)

By way of illustration, it might be stated that in closure fasteners of the hook and eye structure, the eye screw forming the keeper for the hook, usually becomes loose within its opening due to constant strains directed to the screw eye keeper, rendering the fastener weak and frequently marring the supporting surface in which the screw eye keeper is positioned.

It is, therefore, the primary object of the invention to provide means for securing the usual screw eye keeper of a hook and eye fastener to the supporting surface in such a way that the screw eye keeper may be adjusted to tighten or loosen the door or closure with which the fastener is used, without the danger of impairing the holding or fastening qualities of the screw eye by frequently rotating the screw eye within a wooden supporting surface to adjust the same.

Another important object of the invention is to provide a securing device of this character having means for holding the screw eye keeper in its positions of adjustment.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawing:

Figure 1 is a fragmental perspective view illustrating a hook and eye fastener wherein the screw eye forming the keeper for the hook is secured in accordance with the present invention.

Fig. 2 is a sectional view through the closure frame and securing plate employed in securing the screw eye keeper, in position.

Referring to the drawing in detail, the reference character 5 indicates a swinging closure or door, to which the pivoted hook 6 of the fastener is secured, by means of the screw eye 7.

The keeper which is in the form of a screw eye, is indicated generally by the reference character 8, the threaded shank 9 thereof being pointed so that it may be directed into a supporting surface, as shown by Fig. 2 of the drawing.

The screw eye 8 extends through a central threaded opening formed in the securing disc 10, the disc 10 being formed of suitable metal to withstand wear incident to frequent adjustment of the screw eye keeper 8.

Screws 11 extend through openings of the securing disc 10 and secure the disc to the supporting surface which in the present showing is the closure frame 12.

Mounted on the threaded shank 9 is the lock nut 13 which may be rotated on the shank, after the proper adjustment of the screw eye keeper has been made, setting up a binding action between the threads of the shank 9 and outer surface of the securing disc 10, holding the screw eye in its positions of adjustment.

When positioning the screw eye keeper, the shank 9 thereof will be positioned in such a way that the eye section thereof will be spaced from the lock nut 13, providing ample clearance between the nut 13 and inner edge of the eye of the keeper to permit of adjustment to lock the eye at the proper point to insure a close fit between the door and closure and its frame.

Should the closure become loose so that a space occurs between the closure and its frame, it is only necessary to loosen the lock nut 13 and rotate the screw eye adjusting the screw eye to the proper position. The lock nut may now be tightened securing the screw eye keeper in its position of adjustment.

This adjustment may be made without varying the opening in which the screw eye shank is positioned, to the end that a tight fit between the screw eye shank and supporting surface will be maintained at all times.

It will be further seen that due to this construction, the surface in which the screw eye is positioned, will not become mutilated by the pulling or jamming of the door or closure while fastened.

It will, of course, be understood that if the closure becomes too tight the adjustment of the screw eye keeper may be made in the opposite direction to compensate for this abnormal condition.

Having thus described the invention, what is claimed is:

In a screw-eye keeper for pivoted hook fasteners, a disc having a central threaded opening, a pointed screw eye threaded into the central threaded opening of the disc with the pointed end of the screw-eye embedded in the supporting surface to which the screw-eye keeper is secured, said disc having screw openings in which securing screws are positioned, securing the disc in position, and a lock nut positioned on the shank of the screw-eye cooperating with the threads of the screw-eye and said disc securing the screw-eye in its adjusted position.

EDWIN H. L. ENGLUND.
HERBERT C. STROHM.

REFERENCES CITED

The following references are of record in the file of this patent:

UNITED STATES PATENTS

| Number | Name | Date |
|---|---|---|
| 815,589 | Johnson | Mar. 20, 1906 |
| 1,091,592 | Schmidgall | Mar. 31, 1914 |
| 1,647,226 | Hicks | Nov. 1, 1927 |
| 2,034,331 | De Vilbiss | Mar. 17, 1936 |
| 2,203,500 | Loggins | June 4, 1940 |